Figures 1, 2:
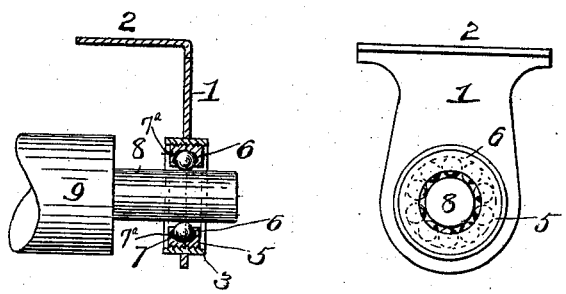

No. 708,736. Patented Sept. 9, 1902.
J. RENNER.
ROLLER BEARING SUPPORT FOR SHADE ROLLERS.
(Application filed May 17, 1901.)

(No Model.)

Witnesses
G. F. Downing
S. Y. Nottingham

Inventor
John Renner
by H. A. Seymour
Atty.

UNITED STATES PATENT OFFICE.

JOHN RENNER, OF BURLINGTON, IOWA.

ROLLER-BEARING SUPPORT FOR SHADE-ROLLERS.

SPECIFICATION forming part of Letters Patent No. 708,736, dated September 9, 1902.

Application filed May 17, 1901. Serial No. 60,746. (No model.)

*To all whom it may concern:*

Be it known that I, JOHN RENNER, a resident of Burlington, in the county of Des Moines and State of Iowa, have invented certain new and useful Improvements in Roller-Bearing Supports for Shade-Rollers; and I do hereby declare the following to be a full, clear, and exact description of the invention, such as will enable others skilled in the art to which it appertains to make and use the same.

My invention relates to improved roller-bearing supports for shade-rollers, the object of the invention being to provide improved means of this character which will greatly lessen friction on the roller, thereby reducing the strain on the spring and lengthening its life.

With this object in view the invention consists in certain novel features of construction and combinations and arrangements of parts, as will be more fully hereinafter described, and pointed out in the claim.

In the accompanying drawings, Figure 1 is a view in section illustrating my improvements. Fig. 2 is an end view of the same.

1 represents a bracket flanged at one end, as shown at 2, for its attachment to its support and provided in its outer end with an opening through which an internally-screw-threaded sleeve 3 passes, said sleeve being secured in the opening in the bracket by brazing or in any other suitable manner. Into the sleeve 3 a screw-threaded ring 5 is screwed, and said inner ring is grooved in its side face to form one half of a runway for ball-bearings 6, the other half of said runway being formed by an externally-screw-threaded ring 7, having notches 7$^a$ in its outer face for the reception of a spanner-wrench to force it home. The rings 5 and 7 when together form a runway for the balls, which is more than a semicircle in cross-section to prevent the balls from falling out, but permit them to project beyond the rings, so as to form a bearing for the spindle 8 on the end of roller 9, as clearly shown in Fig. 1.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

As a new article of manufacture, a support for shade-rollers comprising a depending bracket having an opening therein, an internally-screw-threaded sleeve passing through said opening and secured therein, two rings screwed into said sleeve, each ring having a concave groove adapted to register with the groove in the other ring, the two grooves forming a runway, and balls located within said runway and projecting therefrom to form a bearing for the journal for a shade-roller.

In testimony whereof I have signed this specification in the presence of two subscribing witnesses.

JOHN RENNER.

Witnesses:
CHAS. C. CLARK,
JNO. J. SEEDEY.